(12) United States Patent
Kondo et al.

(10) Patent No.: US 11,840,620 B2
(45) Date of Patent: Dec. 12, 2023

(54) DECORATIVE SHEET AND PRESSURE-SENSITIVE ADHESIVE COMPOSITION APPLIED THERETO

(71) Applicant: 3M INNOVATIVE PROPERTIES COMPANY, St. Paul, MN (US)

(72) Inventors: Shinsuke Kondo, Yamagata (JP); Eumi Pyun, St. Paul, MN (US); Masaaki Furusawa, Yamagata (JP)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 930 days.

(21) Appl. No.: 15/554,069

(22) PCT Filed: Mar. 2, 2016

(86) PCT No.: PCT/US2016/020329
§ 371 (c)(1),
(2) Date: Aug. 28, 2017

(87) PCT Pub. No.: WO2016/141001
PCT Pub. Date: Sep. 9, 2016

(65) Prior Publication Data
US 2018/0072921 A1   Mar. 15, 2018

(30) Foreign Application Priority Data
Mar. 4, 2015   (JP) ................ 2015-042998

(51) Int. Cl.
*C09J 133/06*   (2006.01)
*C08K 3/00*   (2018.01)
(Continued)

(52) U.S. Cl.
CPC ............... *C08K 5/29* (2013.01); *C08K 3/016* (2018.01); *C08K 5/0025* (2013.01);
(Continued)

(58) Field of Classification Search
None
See application file for complete search history.

(56) References Cited

U.S. PATENT DOCUMENTS 5,851,663 A * 12/1998 Parsons ................ C08K 5/0066
428/356
6,646,050 B2 * 11/2003 Ohrui .................... C03C 17/322
525/123
(Continued)

FOREIGN PATENT DOCUMENTS

CN   103865449 A   6/2014
EP   0115871 A2 *   8/1984   .......... C08L 2666/20
(Continued)

OTHER PUBLICATIONS

Machine translation JP 2008-143165 (Year: 2008).*
(Continued)

*Primary Examiner* — Alexandre F Ferre (57) ABSTRACT

A decorative sheet according to an embodiment of the present disclosure contains a film layer having an upper face and a lower face, and a pressure-sensitive adhesive layer adhered to the lower face of the film layer, the pressure-sensitive adhesive layer containing an acrylic-based adhesive and 5 part by mass to 10 part by mass % of ammonium polyphosphate per 100 part by mass of the acrylic-based adhesive.

8 Claims, 2 Drawing Sheets

(51) Int. Cl.
  *C08K 5/00* (2006.01)
  *C08K 5/29* (2006.01)
  *C08K 3/016* (2018.01)
  *C09J 7/38* (2018.01)
  *C09J 7/22* (2018.01)
  *C08K 3/32* (2006.01)

(52) U.S. Cl.
  CPC .............. *C08K 5/0066* (2013.01); *C09J 7/22* (2018.01); *C09J 7/38* (2018.01); *C09J 133/06* (2013.01); *C08K 2003/323* (2013.01); *C08K 2201/003* (2013.01); *C09J 2301/408* (2020.08); *C09J 2423/046* (2013.01); *C09J 2423/106* (2013.01); *C09J 2427/006* (2013.01); *C09J 2433/00* (2013.01); *C09J 2475/006* (2013.01)

(56) References Cited

U.S. PATENT DOCUMENTS

| | | | |
|---|---|---|---|
| 7,611,771 B2 * | 11/2009 | Ohara | C09K 21/04 252/608 |
| 2004/0234753 A1 | 11/2004 | Husemann et al. | |
| 2005/0227065 A1 | 10/2005 | Nishimura | |
| 2008/0102243 A1 | 5/2008 | Gupta | |

FOREIGN PATENT DOCUMENTS

| | | | |
|---|---|---|---|
| EP | 0955349 A2 * | 11/1999 | |
| JP | 07315817 A * | 12/1995 | |
| JP | H08-193187 A | 7/1996 | |
| JP | H09-286958 A | 11/1997 | |
| JP | H10-237263 | 9/1998 | |
| JP | H11-189753 A | 7/1999 | |
| JP | 2000-038785 A | 2/2000 | |
| JP | 2000-230162 A | 8/2000 | |
| JP | 2002-338906 A | 11/2002 | |
| JP | 2004-307747 A | 4/2003 | |
| JP | 2003-171878 A | 6/2003 | |
| JP | 2004-123805 A | 4/2004 | |
| JP | 2005-041997 A | 2/2005 | |
| JP | 2006-219564 A | 2/2005 | |
| JP | 2007-069347 A | 3/2007 | |
| JP | 2008143165 A * | 6/2008 | |
| JP | 2009-242775 A | 10/2009 | |
| JP | 2013-177510 | 9/2013 | |
| JP | 2013-234322 A | 11/2013 | |
| WO | WO 1995-32257 | 11/1995 | |
| WO | WO 2005-063878 A1 | 7/2005 | |

OTHER PUBLICATIONS

Machine translation JP-07315817, provided by Google Patents (Year: 2023).*
International Search Report for PCT International Application No. PCT/US2016/020329, dated Jul. 12, 2016, 4pgs.
Cao, "Acrylate Pressure Sensitive Adhesives", Bonding Technique Manual, Table 1-14 on p. 191, and paragraph 2 on p. 192, Shanghai Scientific & Technical Publishers, Aug. 1988, 1$^{st}$ Edition.
Anonymous: "Ammonium Polyphosphate", Wikipedia, Apr. 3, 2020, pp. 1-2.

* cited by examiner

FIG. 3

DECORATIVE SHEET AND PRESSURE-SENSITIVE ADHESIVE COMPOSITION APPLIED THERETO

CROSS REFERENCE TO RELATED APPLICATIONS

This application is a national stage filing under 35 U.S.C. 371 of PCT/US2016/020329, filed Mar. 2, 2016, which claims the benefit of Japanese Application No. 2015-042998, filed Mar. 4, 2015, the disclosure of which is incorporated by reference in its/their entirety herein.

FIELD OF THE INVENTION

The present disclosure relates to a decorative sheet and a pressure-sensitive adhesive composition applied thereto, especially relates to a low flammable decorative sheet having a fire-proof performance and a pressure-sensitive adhesive composition applied thereto.

BACKGROUND

Pressure-sensitive adhesives are used in the form of tape or as an adhesive paint in many applications relating to automobiles, aircraft, construction, and electrical and electronic products. Many of these applications require a nonflammable pressure-sensitive adhesive. A flame retardant is normally added to the pressure-sensitive adhesive to impart nonflammability. While adding a large quantity of flame retardant improves the nonflammability of the pressure-sensitive adhesive, it reduces adhesion performance.

Patent Document 1 (Japanese Unexamined Patent Application Publication (translation of PCT application) No. H10-501009A) describes a "pressure-sensitive adhesive composition comprising an adhesive selected from the group consisting of rubber resin adhesives and acrylic-based adhesives, containing from approximately 10 wt % to approximately 60 wt % non-halogenated foaming flame retardant relative to the adhesive."

Patent Document 2 (Japanese Unexamined Patent Application Publication No. H10-237263A) describes "an acrylic resin composition comprising 100 parts by weight of at least one type of thermoplastic acrylic copolymer selected from branched copolymers having a comb-like skeleton, branched copolymers having a star-like skeleton, (A-B-A)$_n$-type block copolymers, and (A-B)$_n$-type block copolymers, a total amount of from 20 to 200 parts by weight of phosphorus compound and neutralized thermally expandable graphite, and from 50 to 500 parts by weight of inorganic filler, wherein the weight ratio of neutralized thermally expandable graphite and phosphorus compound is from 9:1 to 1:100 [In the formula, A represents a vinyl polymer block, B represents a (co)polymer block containing, as a constituent unit, a (meth)acrylic acid ester represented by the general formula $CH_2=CR^1COOR^2$ (wherein $R^1$ represents a hydrogen atom or a methyl group, and $R^2$ represents an alkyl group having from 2 to 14 carbons)]."

PRIOR ART DOCUMENTS

Patent Document 1: Japanese Unexamined Patent Application Publication (Translation of PCT Application) No. H10-501009A Patent Document 2: Japanese Unexamined Patent Application Publication No. H10-237263A

SUMMARY OF THE INVENTION

Pressure-sensitive adhesives are normally used in factories and outdoors in applications such as construction. Temperatures in factories and outdoors may reach, for example, not more than 10° C. or not more than 5° C. in winter, and adhesion performance, particularly tack (initial adhesion) of pressure-sensitive adhesives is greatly reduced at such low temperatures. A decrease in tack may diminish the ease of handling of the pressure-sensitive adhesive, for example, the workability of a decorative sheet having an adhesive layer containing such a pressure-sensitive adhesive. In building use, low flammability is requested. It is requested that total calorific value during the combustion is low.

An object of the present disclosure is to provide a decorative sheet that can achieve both maintenance of adhesion performance, particularly suppression of a decrease in tack at a low temperature, and low flammability, and a pressure-sensitive adhesive composition suitable for such a decorative sheet.

According to an embodiment of the present disclosure, a decorative sheet is provided, the decorative sheet containing a film layer having an upper face and a lower face, and a pressure-sensitive adhesive layer adhered to the lower face of the film layer, the pressure-sensitive adhesive layer containing a pressure sensitive adhesive composition containing an acrylic-based adhesive and 5 to 10 part by mass of ammonium polyphosphate per 100 part by mass of the acrylic-based adhesive.

According to another embodiment of the present disclosure, a pressure-sensitive adhesive composition is provided, the pressure-sensitive adhesive composition containing an acrylic-based adhesive and 5 to 10 part by mass of ammonium polyphosphate per 100 part by mass of the acrylic-based adhesive.

Effect of the Invention

The decorative sheet and pressure-sensitive adhesive composition of the present disclosure can achieve both suppression of a decrease in tack at low temperature (for example, 5° C.), and low flammability. The decorative sheet of the present disclosure has low flammability satisfying a standard of nonflammablity in architectural use, and has sufficient tack for working in low-temperature environments, for example.

Note that the above descriptions should not be construed to be a disclosure of all of the embodiments and benefits of the present invention.

BEST MODE FOR CARRYING OUT THE INVENTION

For the purpose of illustrating typical embodiments of the present invention, typical embodiments of the present invention are described in detail below, referring to the figures, but the present invention is not limited to these embodiments.

In the present disclosure, "sheet" encompasses relatively thin articles called "films."

In the present disclosure, "(meth)acrylic" refers to "acrylic or methacrylic", and "(meth)acrylate" refers to "acrylate or methacrylate".

In the present disclosure, "pressure-sensitive adhesion" refers to the characteristic of a material or composition that adheres to various surfaces with light pressure and does not exhibit a phase change (from liquid to solid).

A decorative sheet of an embodiment of the present disclosure contains a film layer having an upper face and a lower face, and a pressure-sensitive adhesive layer adhered to the lower face of the film layer. The pressure-sensitive adhesive layer contains an acrylic-based adhesive and 5 to 10 part by mass of ammonium polyphosphate per 100 part by mass of the acrylic-based adhesive.

Figure 1:
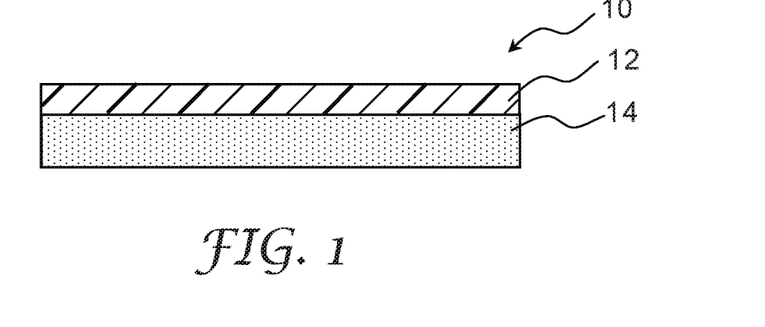
FIG. 1 is a schematic cross-sectional view of a decorative sheet according to an embodiment of the present disclosure.

FIG. 1 is a schematic cross-sectional view of a decorative sheet 10 according to an embodiment of the present disclosure. The decorative sheet 10 contains a film layer 12 having an upper face and a lower face, and a pressure-sensitive adhesive layer 14 adhered to the lower face of the film layer 12. As illustrated in FIG. 1, the film layer 12 and the pressure-sensitive adhesive layer 14 may be directly adhered or may be adhered via a bonding layer. The film layer 12 may have surface treatment such as primer treatment or corona treatment on the adhesion surface with the pressure-sensitive adhesive layer 14.

The polymer contained in the film layer contains at least one type of polymer selected from the group consisting of polyvinyl chloride, polyurethane, polyethylene, polypropylene, and fluororesin. The film layer may be a single layer, or may be a laminate of a plurality of layers.

In an embodiment, a printed pattern is imparted on the surface of the film layer. The printed pattern may be formed on the film layer using a colorant such as toner or ink. The printed pattern may be formed using a printing technique such as gravure printing, electrostatic printing, screen printing, inkjet printing or offset printing. The surface of the film layer on which the printed pattern is imparted may be the lower face of the film layer, i.e., the face to which the pressure-sensitive adhesive layer is adhered (in this case, the printed pattern is disposed between the film layer and the pressure-sensitive adhesive layer), or the upper face of the film layer.

In an embodiment, the film layer has a brightening layer. The brightening layer may be a metal thin film containing a metal such as aluminum, nickel, gold, platinum, chromium, iron, copper, tin, indium, silver, titanium, lead, zinc or germanium, or alloys or compounds thereof, formed by vacuum deposition, sputtering, ion plating, plating or the like on the film layer. The thickness of the metal thin layer may be, for example, not less than approximately 10 nm or not less than approximately 20 nm, and not greater than approximately 100 nm or not greater than approximately 80 nm.

The brightening layer may be a brightening resin layer in which pigments such as aluminum brightening material, such as aluminum flakes, vapor-deposited aluminum flakes, metal oxide-coated aluminum flakes, colored aluminum flakes, or the like, or pearl brightening material, such as flake or synthetic mica covered with a metal oxide such as titanium oxide, iron oxide, or the like, are dispersed in a binder resin such as acrylic resin, polyurethane resin or the like. The brightening layer may use a metal foil of aluminum, nickel, gold, silver, copper, or the like. The thickness of the brightening resin layer or metal foil may be, for example, not less than approximately 1 μm or not less than approximately 5 μm, and not greater than approximately 50 μm or not greater than approximately 20 μm.

In an embodiment, the film layer has a surface-protecting layer on the upper face of the film layer. The surface-protecting layer may be formed by laminating a film of resin, such as polyester such as polyethylene terephthalate (PET), polyvinyl chloride, polyimide, polyurethane, acrylic resin, epoxy resin or fluororesin, directly on the film layer or via a bonding layer, or by coating a resin composition onto the film layer surface and drying. Luster finishing or matte finishing can be implemented on the surface of the surface-protecting layer, according to the intended application. The thickness of the surface-protecting layer may be decided as appropriate depending on the aspect of use of the decorative sheet without particular limitation, but may be, for example, not less than approximately 1 μm, not less than approximately 2 μm, or not less than approximately 5 μm, and not greater than approximately 50 μm, not greater than approximately 30 μm, or not greater than approximately 20 μm.

The film layer and/or surface-protecting layer may have a relief form surface. The pattern of the relief form surface may be regular or irregular, and is not particularly limited, but examples include parallel lines, wood grain, grainy, pebbled, cloth grain, pearskin, leather dyed pattern, matte, hairlines, spins, characters, symbols, geometric forms, and the like. If the relief form is formed by grooves, the width of the grooves is generally not less than approximately 5 μm or not less than approximately 10 μm, and not greater than approximately 1 mm or not greater than approximately 100 μm.

The thickness of the film layer is, for example, not less than approximately 10 μm, not less than approximately 50 μm, or not less than approximately 130 μm, and not greater than approximately 350 μm, not greater than approximately 230 μm, or not greater than approximately 150 μm. The thickness of the film layer also includes the thickness of the optional components of the printed pattern, brightening layer, and surface-protecting layer. The thinner the film layer, the more advantageous it is for nonflammability, and therefore, in applications that require greater nonflammability, the thickness of the film layer is preferably not less than approximately 10 μm or not less than approximately 50 μm, and not greater than approximately 230 μm or not greater than approximately 150 μm. Note that in this specification, word of "nonflamability" includes a low flammability which has low total calorific value at the heat release test used in building use.

The mass (basis weight) of the film layer per unit area is one of the factors that influences the nonflammability of the decorative sheet. In several embodiments, the basis weight of the film layer is not less than approximately 60 g/m$^2$, not less than approximately 100 g/m$^2$, or not less than approximately 150 g/m$^2$, and not greater than approximately 1000 g/m$^2$, not greater than approximately 500 g/m$^2$, or not greater than approximately 400 g/m$^2$. The basis weight of the film layer also includes the basis weight of the optional components of the printed pattern, brightening layer, and surface-protecting layer. The basis weight of the film layer can be selected in accordance with the resin that constitutes the film layer. For example, if the film layer contains polyvinyl chloride, it is advantageous from the perspective of balancing the strength and nonflammability of the decorative sheet if the basis weight of the film layer is not less than approximately 150 g/m$^2$ and not greater than approximately 250 g/m$^2$.

The film layer may also contain strengthening agents such as plasticizers, fillers, and glass fibers, pigments such as zinc oxide and titanium oxide, and additives such as antioxidants, UV absorbants, heat stabilizers and the like. Because pigments generally have high specific gravity, the basis weight of a film layer that contains such pigments may exceed the above-mentioned range.

The acrylic-based adhesive composition of the pressure-sensitive adhesive layer contains an acrylic-based adhesive, and 5 part by mass to 10 part by mass of ammonium polyphosphate per 100 part by mass of the acrylic-based adhesive.

Figure 2:
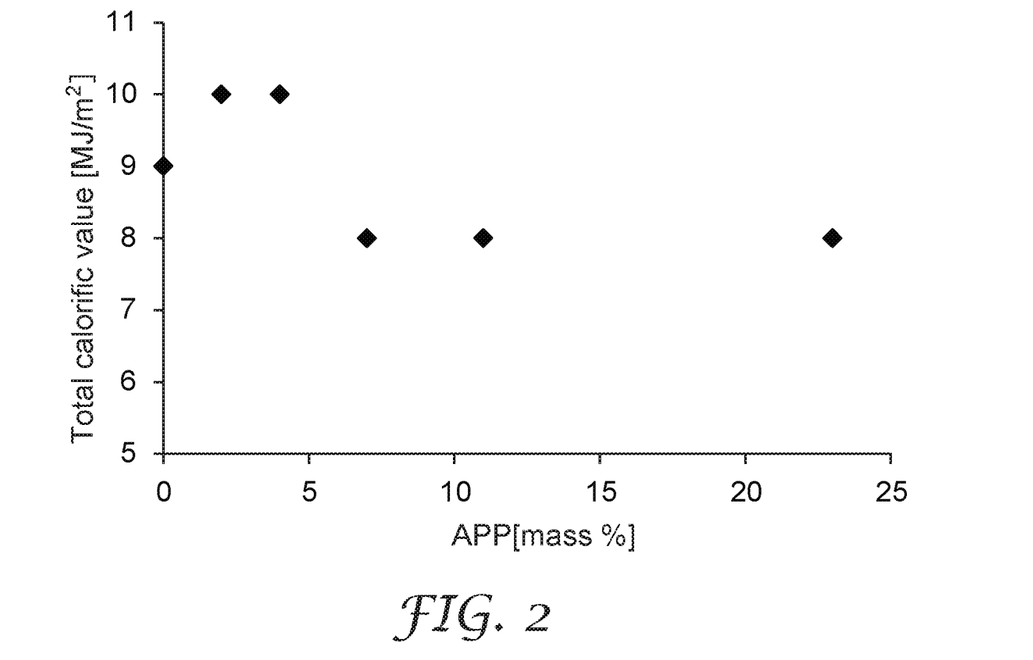
FIG. 2 is a graph showing the relationship between added quantity of ammonium polyphosphate and total calorific value obtained in working examples.
Figure 3:
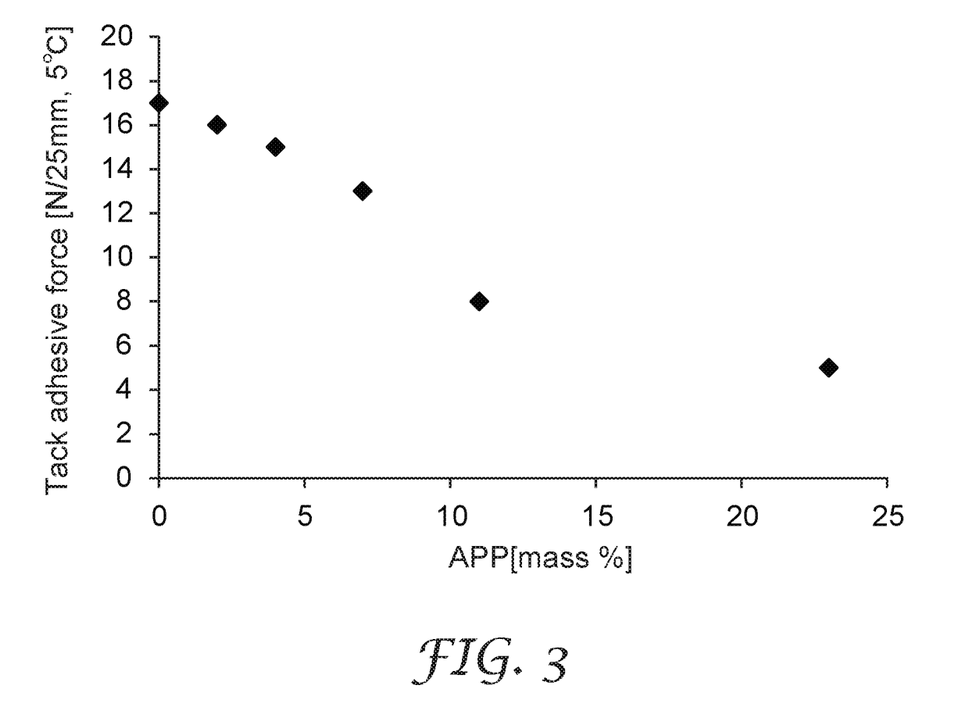
FIG. 3 is a graph showing the relationship between added quantity of ammonium polyphosphate and tack adhesive force obtained in working examples.

The content of ammonium polyphosphate is preferably not less than approximately 6 part by mass and not greater than approximately 8 part by mass per 100 part by mass of the acrylic-based adhesive. As illustrated in FIG. 2 to be described below, the content of ammonium polyphosphate being not less than approximately 5 part by mass enables great improvement of flame retardance of the pressure-sensitive adhesive despite the small content. On the other hand, if the content of the ammonium polyphosphate is over approximately 10 part by mass, the effect on improving flame retardance becomes saturated. Furthermore, as illustrated in FIG. 3, tackiness at low temperature decreases as the content of ammonium polyphosphate is increased. Therefore, by setting the ammonium polyphosphate content to the very small amount of approximately 5 part by mass to approximately 10 part by mass, both flame retardance and tackiness at low temperature can be achieved. The decorative sheet of the present disclosure, which uses ammonium polyphosphate as a flame retardant, has a low total calorific value and exhibits excellent low flammability, or nonflammability, especially in a heat release test (cone calorimetry) according to ISO 5660-1 in which the surface of a sample is combusted while providing radiant heat. Note that, solid components of the pressure-sensitive adhesive composition, that is, the ammonium polyphosphate content is about 12 mass % to about 20 mass %, preferably 14 mass % to about 18 mass %. Note that the total solid content of the pressure-sensitive adhesive is defined as 100 mass % in this case.

The decorative sheet that uses ammonium polyphosphate as a flame retardant generate low-toxic gas when combusted, unlike flame retardance systems that contain a halogen-based compound and, as necessary, flame retardance aids (for example, antimony oxide). Ammonium polyphosphate generates char by hydrolysis, and by the generated char coating the decorative sheet surface, it blocks heat from the combustion site and inhibits diffusion of decomposition gas to achieve low flammability. It is also thought that radical trapping contributes to the flame retardance mechanism of ammonium polyphosphate.

This invention is unrestrained by any theory and thoughts, but it is considered that this is because, since char generated by ammonium polyphosphate covering the decorative sheet surface contributes to improvement of flame retardance, ammonium polyphosphate can effectively improve flame retardance when contained in a very small amount, and that once the char covers the surface adding excess flame retardant hardly contributes to further improvement of flame retardance. However, these estimations are not limited to the flame retardance mechanism of the decorative sheet of the present disclosure.

It is advantageous if the ammonium polyphosphate is granular. Granular ammonium polyphosphate is locally present in the pressure-sensitive adhesive composition, and can suppress a decrease in the effective adhesion area of the adhesive and changes in the physical properties of the adhesive, and as a result, it can maintain the adhesion performance of the adhesive. The average particle diameter of the ammonium polyphosphate is preferably not less than approximately 1 µm and not greater than approximately 30 µm, and more preferably not less than approximately 5 µm and not greater than approximately 20 µm.

Type II ammonium polyphosphate with a degree of polymerization of not less than 1000 has high moisture resistance and is advantageous for improving flame retardance.

The ammonium polyphosphate may or may not be subjected to surface treatment. Examples of surface treatment are silane treatment, melamine resin coating, and the like. In an embodiment, the ammonium polyphosphate is not be subjected to surface treatment.

The acrylic-based adhesive may contain a combination of ammonium polyphosphate and a second flame retardant selected from the group consisting of antimony oxides and metal compounds. Examples of antimony oxide is antimony trioxide. Examples of metal compounds are zinc boride (ZnB), Aluminum hydroxide ($Al(OH)_3$), Calcium carbonate ($CaCO_3$), and the like.

By using the pressure-sensitive composition including acrylic-based adhesive in the pressure-sensitive adhesive layer, excellent durability and colorfastness can be imparted to the decorative sheet. Because the acrylic-based adhesive is modified easily, the adhesion characteristics can be adjusted in accordance with the application of use. The acrylic-based adhesive contains at least one type of adhesive acrylic-based polymer selected from the group consisting of adhesive acrylic-based homopolymers and copolymers. In an embodiment, the acrylic-based adhesive contains an adhesive homopolymer of a monomer selected from the group consisting of methyl acrylate, butyl acrylate, isoamyl acrylate, isooctyl acrylate, 2-ethylhexyl acrylate, acrylic acid, methacrylic acid, acrylamide, methacrylamide, acrylonitrile, and ethacrylonitrile, or an adhesive copolymer of two or more of these monomers.

The adhesive homopolymer and copolymer can be obtained by polymerizing one of the above monomers or a mixture of the above monomers by an ordinary radical polymerization method such as solution polymerization, suspension polymerization, emulsion polymerization, bulk polymerization, or the like. Polymerization initiators that can be used include organic peroxides such as benzoyl peroxide, lauroyl peroxide, and bis(4-tert-butyl cyclohexyl) peroxy dicarbonate; and azo-based polymerization initiators such as 2,2'-azobisisobutyronitrile, 2,2'-azobis(2-methylbutyronitrile), dimethyl-2,2-azobis(2-methylpropionate), 4,4'-azobis(4-cyanovalerianic acid, 2,2'-azobis(2-methylprionic acid)dimethyl, azobis(2,4-dimethylvaleronitrile) (AVN), and the like. The polymerization initiator is generally used in a quantity of not less than approximately 0.01 parts by mass or not less than approximately 0.05 parts by mass, and not greater than approximately 5 parts by mass or not greater than approximately 3 parts by mass, relative to 100 parts by mass of the monomer or monomer mixture.

In an embodiment, the weight average molecular weight of the adhesive homopolymer or copolymer is not less than approximately 200,000 or not less than approximately 400,000, and not greater than approximately 1,000,000 or not greater than approximately 700,000. The weight average molecular weight of the adhesive homopolymer or copolymer is determined using standard polystyrene by GPC (gel permeation chromatography).

The adhesive acrylic-based polymer may be crosslinked by a crosslinking agent. Examples of the crosslinking agent that may be used include isocyanate compounds, melamine compounds, poly(meth)acrylate compounds, epoxy compounds, amide compounds, and bisamide compounds, e.g., bisaziridine derivatives of a dibasic acid such as 1,1'-isophthaloyl-bis(2-methylaziridine), and the like. An isocyanate compound, especially hexamethylene diisocyanate, is preferably used as the crosslinking agent. The added quantity of crosslinking agent also depends on the type of crosslinking agent, but is normally not less than approximately 0.1 parts by mass and not greater than approximately 10 parts by mass, and preferably not less than approximately 0.5 parts by mass and not greater than approximately 5 parts by mass, relative to 100 parts by mass of the acrylic-based adhesive.

The glass transition temperature (Tg) of the acrylic-based adhesive is advantageously not less than approximately −60° C. and not greater than approximately −20° C., and preferably not less than approximately −50° C. and not greater than approximately −30° C. By the glass transition temperature of the acrylic-based adhesive being in the above range, sufficient low-temperature tack can be obtained while assuring the cohesive force required for adhesion. Setting of the glass transition point (Tg) was performed by setting the mass ratio of the monomers constituting the copolymer, according to the Fox formula below (Fox, T. G., Bull. Am. Phys. Soc., 1, 1956, p. 123).

$$1/Tg = X_1/(Tg_1+273.15) + X_2/(Tg_1+273.15) + \ldots + X_n/(Tg_n+273.15))$$ Equation 1

(Tg1: the glass transition points of the homopolymers of component 1;
Tg2: the glass transition points of the homopolymers of component 2;
Tgn: the glass transition points of the homopolymers of component n;
X1: the mass ratios of the monomers of the component 1 constituting the copolymer;
X2: the mass ratios of the monomers of the component 2 constituting the copolymer;
Xn: the mass ratios of the monomers of the component n constituting the copolymer;

$$X1+X2+\cdots+Xn=1)$$

The thickness of the pressure-sensitive adhesive layer is generally not less than approximately 5 µm, not less than approximately 10 µm, or not less than approximately 20 µm, and not greater than approximately 100 µm, not greater than approximately 80 µm, or not greater than approximately 50 µm. A thinner pressure-sensitive adhesive layer is advantageous for nonflammability, but a thick pressure-sensitive adhesive layer is desirably used to increase adhesive force. In applications that require a higher level of the balance of nonflammability and adhesive force, the thickness of the pressure-sensitive adhesive layer is preferably not less than approximately 10 µm or not less than approximately 20 µm, and not greater than approximately 80 µm or not greater than approximately 50 µm.

The pressure-sensitive adhesive composition may also contain additives such as tackifiers, elastic microspheres, adhesive polymer microspheres, crystalline polymers, inorganic powders, UV absorbents and the like, provided that the effect of the present invention is conserved.

In an embodiment, the pressure-sensitive adhesive layer may be of a form having independent air bubbles or continuous air bubbles formed by a foaming agent. In another embodiment, the pressure-sensitive adhesive layer may contain hollow microspheres of glass or polymer.

The pressure-sensitive adhesive layer generally forms a flat adhesion face, but may also form an adhesion face having recesses and protrusions. In this adhesion face having recesses and protrusions, protrusions containing the pressure-sensitive adhesive composition and recesses that surround these protrusions are formed on the adhesion face of the pressure-sensitive adhesive layer, and in the state where adhered to an adherend, connection passages are formed between the adherend surface and the adhesion surface, wherein the connection passages connect to outer portions that demarcate the recesses. An example of the method for forming the adhesion face having recesses and protrusions will be described below.

A liner having a release face having a prescribed relief structure is prepared. The release face of this liner is coated with a pressure-sensitive adhesive composition containing acrylic-based adhesive and ammonium polyphosphate, and it is then dried to form a pressure-sensitive adhesive layer. By this, the relief structure (negative structure) of the liner is transferred to the face that adjoins the liner of the pressure-sensitive adhesive layer (this serves as the adhesion face in the decorative sheet), and an adhesion face having recesses and protrusions having the prescribed structure (positive structure) is formed on the adhesion face. As described above, the recesses and protrusions of the adhesion face are designed in advance so as to contain grooves capable of forming the connection passages when the protrusions adhere to the adherend.

The grooves of such a pressure-sensitive adhesive layer may be grooves in a regular pattern in which grooves of a consistent shape are disposed on the adhesion face according to a regular pattern, or may be grooves in an irregular pattern in which grooves of an inconsistent shape are disposed, provided that air bubbles are not prevented from remaining when the decorative sheet is constructed. If a plurality of grooves are formed so as to be disposed substantially parallel to each other, the distance at which the grooves are disposed is preferably from 10 to 2000 µm. The depth of the grooves (distance from the adhesion face to the bottom of the groove measured toward the direction of the film layer) is normally not less than approximately 10 µm and not greater than approximately 100 µm. The shape of the grooves is not particularly limited provided that the effect of the present invention is conserved. For example, the shape of the groove may be substantially rectangular (including trapezoidal), substantially semi-circular, or substantially semi-elliptical at the cross-sectional face of the groove in the direction perpendicular to the adhesion face.

The decorative sheet may also have a release liner on a face of the pressure-sensitive adhesive layer opposite the film layer. Examples of typical release liners include liners prepared from paper (for example, kraft paper) and polymer materials (for example, polyolefins such as polyethylene or polypropylene; polyesters such as ethylene vinyl acetate, polyurethane or polyethylene terephthalate. The release liner may be coated as necessary with a layer of release agent such as a silicone-based material or fluorocarbon-based material. The thickness of the release layer is generally not less than approximately 5 µm, not less than approximately 15 µm, or not less than approximately 25 µm, and not greater than approximately 300 µm, not greater than approximately 200 µm, or not greater than approximately 150 µm.

The decorative sheet may be obtained by applying a pressure-sensitive adhesive composition, containing an adhesive acrylic-based polymer and ammonium polyphosphate, and, as necessary, a crosslinking agent and other additives, on the film layer using knife coating, roller coating, melt extrusion, lamination, or the like. The pressure-sensitive adhesive composition may be a solventless system, or may be a solution of an organic solvent such as ethyl acetate, butyl acetate, acetone, methyl ethyl ketone, toluene or the like. The pressure-sensitive adhesive composition is a solution of an organic solvent, and/or, if it contains a crosslinking agent, organic solvent removal and/or crosslinking may be performed by heating after coating.

The total calorific value of the decorative sheet of an embodiment is preferably not greater than 8 MJ/m$^2$ as a total for 5 minutes, 10 minutes, or 20 minutes when measured using cone calorimetry according to ISO 5660-1. According to fire preventive material standards, the decorative sheet is classified as flame retardant if its total calorific value is not greater than 8 mJ/m$^2$ as a total for 5 minutes, quasi-nonflammable if not greater than 8 MJ/m$^2$ as a total for 10 minutes, and nonflammable if not greater than 8 MJ/m$^2$ as a total for 20 minutes.

The loop tack of the decorative sheet of an embodiment is not less than approximately 10 N/25 mm, not less than approximately 12 N/25 mm, or not less than approximately 14 N/25 mm, when measured at 5° C. according to a test method described later According to an embodiment of the present disclosure, a pressure-sensitive adhesive composition is provided, the pressure-sensitive adhesive composition containing an acrylic-based adhesive and 5 part by mass to 10 part by mass of ammonium polyphosphate per 100 part by mass of the acrylic-based adhesive. The ammonium polyphosphate, adhesive acrylic-based polymer, crosslinking agent, and other additives are as already described.

The decorative sheet of the present disclosure may be used in a variety of indoor and outdoor applications where nonflammability is required, e.g., automobiles, aircraft, construction, and electrical and electronic products, and in particular, can be used advantageously as, for example, an inside wall decorative film in construction applications.

EXAMPLES

In the following working examples, specific embodiments of the present disclosure are exemplified, but the present invention is not restricted thereto. All parts and percentages are by mass unless otherwise indicated.

The reagents, raw materials, and the like used in these working examples are shown below in Table Heat Release Test—Total Calorific Value The total calorific value of the decorative sheets is evaluated by cone calorimetry according to ISO 5660-1. A test piece (10 cm×10 cm) is placed level at the sample placement site of a cone calorimeter, and radiant heat of 50 kW/m$^2$ is provided by a cone-type electric heater from above. The test piece is ignited by an electric spark plug, and the test is conducted for 20 minutes. The calorific value is determined based on the amount of oxygen consumption using combustion gas analysis.

Loop Tack Method—Tack Adhesive Force

The decorative sheets are cut to 150 mm length×25.4 width to make test pieces. As a test substrate, a decorative sheet (DI-NOC™ film PS-959, manufactured by 3M Japan Ltd.) is glued onto an aluminum sheet 70 mm×150 mm×1 mm thick. The test piece is left to stand together with the test substrate for 24 hours in a 5° C. atmosphere.

In a 5° C. atmosphere, the release paper of the test piece is completely removed, and with the adhesion face on the outside, it is fastened at locations 15 mm from both ends using a tape and formed into a loop. The test piece is placed in an RTG series Tensilon™ (A&D Co., Ltd.) such that the test substrate surface and the center part of the loop are level. The test piece or test substrate is moved at 300 mm/minute up to the position where the distance between the chuck bottom end and the test substrate surface is 30 mm. Immediately after that, adhesive force when peeled at a speed of 100 mm/minute is measured. The test substrate surface is cleaned with ethanol before the test and each time the test is performed.

Working Examples 1 to 4 and Comparative Examples 1 to 7

A monomer mixture of BA/AA=94/6 (mass ratio) was copolymerized in ethyl acetate, and a solution of 38 mass % acrylic-based copolymer was prepared as acrylic-based adhesive. The number average molecular weight Mn of the obtained acrylic-based copolymer was 9.7×10$^4$, weight average molecular weight Mw was 6.5×10$^5$, polydispersity Mw/Mn was 6.7, and glass transition temperature Tg was −48° C.

Pressure-sensitive adhesive compositions were prepared by mixing a flame retardant and the acrylic-based adhesive such that the acrylic-based adhesive 100 part by mass and ammonium polyphosphate (APP) or another flame retardant

TABLE 1

| Compound name, brand name or abbreviation | Description | Supplier |
| --- | --- | --- |
| EXOLIT ™ AP423 | Ammonium polyphosphate, type II, average particle diameter 8 μm, degree of polymerization 1000 | Clariant Japan Ltd. (Bunkyo-ku, Tokyo, Japan) |
| EXOLIT ™ AP422 | Ammonium polyphosphate, type II, average particle diameter 15 μm, degree of polymerization 1000 | Clariant Japan Ltd. (Bunkyo-ku, Tokyo, Japan) |
| Taien C = II | Ammonium polyphosphate, type II, average particle diameter 20 μm | Taihei Chemical Industrial Co., Ltd. (Chuo-ku, Osaka, Japan) |
| Taien K___ | Ammonium polyphosphate, type I, average particle diameter 20 μm, degree of polymerization 50 | Taihei Chemical Industrial Co., Ltd. (Chuo-ku, Osaka, Japan) |
| FR370 | Tri (tribromoneopenthyl) phosphate | ILO Industrial Products (Israel) |
| ATO | Antimony trioxide, MSA | Yamanaka and Co., Ltd (Cyuo-ku, Osaka, Japan) |
| ZnB, FIREBRAKE ™ | Zinc boride | U.S. Borax Inc. (California, USA) |
| BA | Acrylic acid n-butyl ester | Mitsubishi Chemical Corporation (Chiyoda-ku, Tokyo, Japan) |
| AA | Acrylic acid | Toagosei Co., Ltd. (Minato-ku, Tokyo, Japan) |
| Coronate (TM) L-55E | 1,6-hexamethylene diisocyanate (HDMI) | Tosoh Corporation (Minato-ku, Tokyo, Japan) | shown in Table 2 in the compounded amount shown in Table 2. Contents of solid components of pressure-sensitive adhesive, or, contents of solid components of the flame retardant were shown in Table 2 by mass % when dried pressure-sensitive adhesive composition is defined as 100 mass %.

The obtained pressure-sensitive adhesive composition was spread by a knife coater on an emboss-finished PVC film (manufactured by 3M Japan Ltd.) such that the thickness after drying was 40 μm. The composition of the PVC film was polyvinyl chloride/plasticizer (diisononyl phthalate)/additives (acrylic resin, zinc stearate etc.)=66.5/19.5/14.0 (mass ratio). After that, it was dried by heating at 90° C. for 2 minutes, to produce a decorative sheet.

The obtained decorative sheet was glued to a gypsum board substrate (manufactured by Yoshino Gypsum Co., Ltd., thickness 12.5 mm) after being treated with a primer (WP-2000, manufactured by 3M Japan Ltd.) to improve adhesiveness of the interface between the decorative sheet and the gypsum board. The coated amount of the primer was 10 g/m² by solid content.

The total calorific value of the obtained test material was measured by a heat release test. The results are given in Table 2. FIG. 2 is a graph showing the relationship between added quantity of ammonium polyphosphate AP423 and total calorific value.

TABLE 2

| | Flame Retardant | Added quantity (part by mass) | Content (Mass %) | Total calorific value (MJ/m²) |
|---|---|---|---|---|
| Comparative Example 1 | AP423 | 0 | 0 | 9 |
| Comparative Example 2 | AP423 | 2 | 5 | 10 |
| Comparative Example 3 | AP423 | 4 | 10 | 10 |
| Example 1 | AP423 | 7 | 16 | 8 |
| Example 2 | Taien C = II | 7 | 16 | 8 |
| Example 3 | AP422 | 7 | 16 | 8 |
| Example 4 | Taien K | 7 | 22 | 9 |
| Comparative example 4 | AP423 | 11 | 38 | 8 |
| Comparative Example 5 | AP423 | 23 | 16 | 8 |
| Comparative example 6 | FR370 + ATO | 25 + 10 | 48 | 8 |
| Comparative example 7 | ZnB | 8 | 17 | 9 |

Working Examples 5 to 8 and Comparative Examples 8 to 15

2.17 parts by mass of Coronate™ L-55E per 100 parts by mass of the acrylic-based adhesive used in Working Example 1 (solid content) was added as a crosslinking agent to the acrylic-based copolymer solution. A pressure-sensitive adhesive composition was prepared by mixing flame retardant and the acrylic-based copolymer solution such that the acrylic-based adhesive after drying contained ammonium polyphosphate (APP) or other flame retardant in the compounded amount shown in Table 3.

The obtained pressure-sensitive adhesive composition was spread by a knife coater on double-sided polyethylene-treated release paper in which silicone-treated faces had been given a relief structure (SCW1034, manufactured by 3M Japan Ltd.) such that the thickness after drying was 40 μm. Then, it was dried by heating for 2 minutes at 65° C. and 2 minutes at 90° C., and then crosslinked for 48 hours at 40° C. to form a pressure-sensitive adhesive layer containing a pressure sensitive adhesive composition. After that, a decorative film (FW-607H, manufactured by 3M Japan Ltd.) was dry-laminated on the pressure-sensitive adhesive layer to produce a decorative sheet. Note that in Comparative Example 13, a decorative sheet could not be produced because the adhesive force was too low.

The tack adhesive force of the obtained decorative sheet was measured by the loop tack method. The results are shown in Table 3. FIG. 3 is a graph showing the relationship between added quantity of ammonium polyphosphate AP423 and tack adhesive force.

The pressure-sensitive adhesive compositions of Examples 5 and 6 were measured by a heat release test in the same manner of Examples 1 and 2. The results are showed in Table 3. Regardless of adding of the cross-linking, the total calorific value were almost same as Examples 1 and 2.

TABLE 3

| | Flame Retardant | Added quantity (part by mass) | Tack adhesive force (N/25 mm, 5° C.) | Total calorific value (MJ/m²) |
|---|---|---|---|---|
| Comparative Example 8 | AP423 | 0 | 17 | — |
| Comparative Example 9 | AP423 | 2 | 16 | — |
| Comparative Example 10 | AP423 | 4 | 15 | — |
| Example 5 | AP423 | 7 | 13 | 8 |
| Example 6 | Taien C = II | 7 | 13 | 8 |
| Example 7 | AP422 | 7 | 13 | — |
| Comparative Example 11 | AP423 | 11 | 8 | — |
| Comparative Example 12 | AP423 | 23 | 5 | — |
| Example 8 | Taien K | 7 | 6 | — |
| Comparative Example 13 | FR370 + ATO | 25 + 10 | 4 | — |
| Comparative Example 14 | ZnB | 8 | 13 | — |

REFERENCE NUMERALS

10 Decorative sheet
12 Film layer
14 Pressure-sensitive adhesive layer

The invention claimed is:
1. A decorative sheet comprising:
a film layer having an upper face and a lower face, and
a pressure-sensitive adhesive layer adhered to the lower face of the film layer, the pressure-sensitive adhesive layer containing a pressure sensitive adhesive composition containing an acrylic-based adhesive and at least one flame retardant consisting essentially of one or more of ammonium polyphosphate, a metal oxide, and a metal compound, wherein the at least one flame retardant comprises 12 to 18 mass % of Type II ammonium polyphosphate as solid components, wherein the amount of ammonium polyphosphate is based on the total solid content of the pressure-sensitive adhesive as 100 mass %,
wherein the pressure-sensitive adhesive layer has a thickness not less than 10 μm and not greater than 80 μm,
wherein an average particle diameter of the ammonium polyphosphate is not greater than 30 μm, wherein a degree of polymerization of the ammonium polyphosphate is not less than 1000, wherein the pressure-sensitive adhesive layer is free of a flame retardant which is a halogen-based compound, and wherein a total calorific value of the decorative sheet is not greater than 8 MJ/m$^2$ as a total for 20 minutes when applied to a gypsum board substrate and measured using cone calorimetry according to ISO 5660-1.

2. The decorative sheet according to claim 1, wherein the film layer contains at least one type of polymer selected from the group consisting of polyvinyl chloride, polyurethane, polyethylene, polypropylene, and fluororesin.

3. The decorative sheet according to claim 1, wherein a thickness of the film layer is from 10 to 350 μm.

4. The decorative sheet according to claim 1, wherein the acrylic-based adhesive contains an adhesive homopolymer of a monomer selected from the group consisting of methyl acrylate, butyl acrylate, isoamyl acrylate, isooctyl acrylate, 2-ethylhexyl acrylate, acrylic acid, methacrylic acid, acrylamide, methacrylamide, acrylonitrile, and ethacrylonitrile, or an adhesive copolymer of two or more of these monomers.

5. The decorative sheet according to claim 1, wherein a glass transition temperature (Tg) of the acrylic-based adhesive is from −60° C. to −20° C.

6. The decorative sheet according to claim 1, wherein the acrylic-based adhesive further contains, as a crosslinking agent, from 0.1 to 10 parts by mass of an isocyanate compound per 100 parts by mass of the adhesive acrylic-based adhesive.

7. The decorative sheet according to claim 6, wherein the isocyanate compound is hexamethylene diisocyanate.

8. The decorative sheet according to claim 1, wherein the at least one flame retardant comprises metal oxide.

* * * * *